United States Patent [19]

Ross et al.

[11] Patent Number: 5,089,544

[45] Date of Patent: Feb. 18, 1992

[54] UNSATURATED POLYESTER RESIN COMPOSITIONS CONTAINING COMPATIBLE COMPOUNDS

[75] Inventors: Louis R. Ross, Newark; Paul R. Krumlauf, Thornville; Edward L. Wilson; Kuang-Hong Hsu, both of Newark, all of Ohio

[73] Assignee: Owens-Corning Fiberglas Corporation, Toledo, Ohio

[21] Appl. No.: 428,548

[22] Filed: Oct. 30, 1989

[51] Int. Cl.$^5$ .............................................. C08K 5/01
[52] U.S. Cl. .................................. 523/511; 524/513
[58] Field of Search ...................... 523/511; 528/192

[56] References Cited

U.S. PATENT DOCUMENTS

| | | |
|---|---|---|
| 3,549,586 | 12/1970 | Smith . |
| 3,650,997 | 3/1972 | Weisfeld et al. . |
| 3,652,502 | 3/1972 | Jackson, Jr. . |
| 3,701,748 | 10/1972 | Kroekel . |
| 3,772,241 | 11/1973 | Kroekel . |
| 3,833,411 | 9/1974 | Vazirani . |
| 3,883,612 | 5/1975 | Pratt et al. . |
| 3,931,422 | 1/1976 | Bateman et al. . |
| 3,931,438 | 1/1976 | Beall et al. . |
| 4,100,229 | 7/1978 | Schwartz, Jr. ............. 523/511 |
| 4,160,758 | 7/1979 | Gardner . |
| 4,263,199 | 4/1981 | Atkins . |
| 4,275,189 | 6/1981 | Danick et al. . |
| 4,288,571 | 9/1981 | Comstock et al. . |
| 4,293,686 | 10/1981 | Gardner ..................... 528/192 |
| 4,374,215 | 2/1983 | Atkins . |
| 4,387,211 | 6/1983 | Yasuda et al. . |
| 4,446,301 | 5/1984 | Belote et al. . |
| 4,459,401 | 7/1984 | Sekmakas et al. . |
| 4,472,544 | 9/1984 | Ochsenheim et al. ........... 523/511 |
| 4,525,498 | 6/1985 | Atkins et al. . |
| 4,525,524 | 6/1985 | Tung et al. . |
| 4,555,534 | 11/1985 | Atkins ........................ 523/507 |
| 4,735,995 | 4/1988 | Chettiath . |
| 4,787,989 | 11/1988 | Faneilli et al. . |

FOREIGN PATENT DOCUMENTS

| | | |
|---|---|---|
| 075765 | 9/1982 | European Pat. Off. . |
| 0335406 | 3/1989 | European Pat. Off. . |

*Primary Examiner*—Paul R. Michl
*Assistant Examiner*—Edward J. Cain
*Attorney, Agent, or Firm*—Patrick P. Pacella; Ted C. Gillespie; Catherine B. Martineau

[57] ABSTRACT

A sheet molding composition is disclosed which includes a four component resinous system which comprises (a) an unsaturated polyester comprising a polycondensation product of one or more dihydric alcohols and one or more ethylenically unsaturated polycarboxylic acids; (b) one or more low-profile additives which are thermoplastic polymers which cause phase separation and porosity during the curing reaction; (c) one or more olefinically unsaturated monomers which copolymerizes with the unsaturated polyester; and, (d) one or more compatible components containing one or more polyoxyethane substituents. The compatible components remain compatible when the polyester and monomer cure and impart improved surface characteristics when added to typical low-profile resin systems.

37 Claims, No Drawings

UNSATURATED POLYESTER RESIN COMPOSITIONS CONTAINING COMPATIBLE COMPOUNDS

BACKGROUND OF THE INVENTION

The present invention provides improved surface smoothness in unsaturated polyester resin compositions that contain low-profile additives. More specifically, these unsaturated resin compositions contain low-profile additives and compatible compounds.

Unsaturated polyester resin compositions are finding increased use in the automotive industry as compositions from which component parts especially body panels can be molded. These compositions contain, in addition to the unsaturated polyesters, so-called low-profile additives which are thermoplastic polymers that act to prevent undesirable shrinkage as the composition is being molded into a thermoset article. Low-profile additives are added to unsaturated polyester compositions for the purpose of obtaining a composition which can be molded into thermoset articles, where the surfaces of the molded articles truly reflect the surface characteristics of the mold.

Two types of low-profile systems are commonly used commercially, one-pack and two-pack. In one-pack systems, the polyester, styrene, and low-profile additives are mutually compatible, i.e., no gross separation occurs when the mixture is allowed to stand. In contrast, two-pack systems form distinct phases if the resins are allowed to stand. These need to be mixed immediately prior to use. In either case phenomena occur that allow these resins to microscopically compensate for shrinkage.

It is the ability of low-profile resins to compensate for shrinkage that leads to the usefulness of these resins. Shrinkage compensation is largely a result of a micro-phase separation that occurs in these unsaturated polyester resin systems. The micro-phase separation occurs during cure for both one-pack and two-pack systems.

Prior to cure the low-profile additive is at least partly soluble in the polyester/styrene solution. As the polyester/styrene mixture crosslinks, the thermoplastic and copolymer become increasingly less compatible and a two-phase (domain-matrix) type morphology results. This micro-phase separation leads to the formation of porous structure as the opposing internal stresses of thermal expansion and polymerization shrinkage occur. In many unsaturated polyester resin compositions the porous structure is a result of microfracturing of the curing resins which gives rise to void formation. Unsaturated polyester resins have been developed which have essentially zero shrinkage and which, in fact, expand upon curing.

In addition to unsaturated polyester resins, sheet molding compound formulations contain other ingredients including chemical thickeners. In such systems, an alkaline material such as magnesium oxide or magnesium hydroxide is added to, for example, an uncured polyester along with fillers, glass fiber, and other standard materials. The alkaline material interacts with residual acidity in the polyester and usually the low-profile additive to build viscosity. This process is referred to as maturation and usually takes several days. If two-pack resins are used, care has to be taken to avoid gross phase separation. After maturation is complete, the thickened systems are handlable and can easily be placed into compression molds either by hand or by machine.

Although the use of low-profile additives as described as three component mixtures do effect some degree of improvement in anti-shrinkage characteristics of the unsaturated polyester compositions, it has been found that significant improvements could yet be made on surface smoothness and processing characteristics.

Prior Art

Low-profile resins have been described that contain unsaturated polyester resins, thermoplastic low-profile additives, and a polymerizable monomer, usually styrene. In addition to these ingredients other materials have been added to low-profile systems to improve specific properties.

The Iseler, et al. U.S. Pat. No. 4,622,354 describes "phase stabilizing agents" that comprise a select group of compounds from three classes: fatty acids, dimer acids and polyester polyols. When used in an SMC formulation where the thermoplastic low-profile additive is polymethylmethacrylate and a urethane prepolymer is included, the phase stabilizing agent reduces the gross separation that occurs during the maturation process. The resin compositions described by Iseler et al. apparently are two-pack systems that evidently phase-separated during maturation prior to adding the phase stabilizers.

The Ochsenbein et al. U.S. Pat. No. 4,472,544 describes an anti-shrink additive with a tri- or tetrafunctional polyether condensation product of propylene oxide on a triol or tetrol wherein the condensation product is acidified in such a manner that it possesses at least one terminal acidic functional group per elementary molecule. This material is used as a low-profile additive.

The Atkins U.S. Pat. No. 4,555,534 describes low-shrink pigmentable unsaturated polyester resins having improved pigmentation which comprises (a) a polyester resin comprising the reaction product of an olefinically unsaturated dicarboxylic acid or anhydride and a polyol; (b) an olefinically unsaturated monomer that is copolymerizable with the polyester resin; (c) a thickening agent comprising an oxide of hydroxide of a metal of Group I, II, or III of the Periodic Table; (d) a pigment; (e) a carboxylated vinyl acetate polymer low-profile additive, and (f) a surface active compound. The Atkins '534 patent describes numerous low-shrink resins wherein improvements have been made on the uniformity of pigmentation in internally pigmented thickened polyester molding compositions. It should be pointed out that pigmentable resin systems are low-shrink, and not low-profile. The surface quality of pigmentable systems is considerably inferior to surfaces required for automotive appearance applications.

Although the use of low-profile additives and thickening agents, as described, do effect improvement in the antishrinkage and surface smoothness characteristics of the unsaturated polyester compositions, they are unable to achieve the degree of surface smoothness required of today's thermoset molded articles.

SUMMARY OF THE INVENTION

The present invention provides a means for improving the surface smoothness in low-profile resin compositions which are compression or injection molded into useful articles. In one aspect, the invention comprises an improved sheet molding composition that includes a four component resinous system:

(a) an unsaturated polyester comprising a poly condensation product of one or more dihydric alcohols and one or more ethylenically unsaturated polycarboxylic acids;

(b) one or more low-profile additives which are thermoplastic polymers which cause phase separation and porosity during the curing reaction;

(c) one or more olefinically unsaturated monomers which copolymerizes with the unsaturated polyester; and, (d) one or more components that remain compatible when the polyester and monomer cure and contain one or more polyoxyethane substituents.

The four component resinous system imparts improved surface smoothness when used with other known conventional ingredients for typical low-profile resin systems used in making molding compositions.

DESCRIPTION OF INVENTION

The present invention relates to the discovery of the use a group of components which remain compatible with a curing unsaturated polyester resin, and monomer used in a low-profile resin system. When these compatible components are included in combination with low-profile additives and used in sheet molding compositions, articles with very smooth surfaces may be molded. Additionally, the flow during the molding process is improved to the point that rapidly curing formulations may be composed, consequently molding time is drastically reduced.

The unsaturated polyester component of the four component resinous system comprises the polycondensation reaction product of one or more dihydric alcohols and one or more ethylenically unsaturated polycarboxylic acids. By polycarboxylic acid is generally meant the polycarboxylic or dicarboxylic acids or anhydrides, polycarboxylic or dicarboxylic acid halides, and polycarboxylic or dicarboxylic esters. Suitable unsaturated polycarboxylic acids, and the corresponding anhydrides and acid halides that contain polymerizable carbon-to-carbon double bonds may include maleic anhydride, maleic acid, and fumaric acid. A minor proportion of the unsaturated acid, up to about forty mole percent, may be replaced by dicarboxylic or polycarboxylic acid that does not contain a polymerizable carbon-to-carbon bond. Examples of which are O-phthalic, isophthalic, terephthalic, succinic, adipic, sebacic, methyl-succinic, and the like. Dihydric alcohols that are useful in preparing the polyesters include 1,2-propane diol (hereinafter referred to as propylene glycol), dipropylene glycol, diethylene glycol, 1,3-butanediol, ethylene glycol, glycerol, and the like. Examples of suitable unsaturated polyesters are the polycondensation products of (1) propylene glycol and maleic and/or fumaric acids; (2) 1,3-butanediol and maleic and/or fumaric acids; (3) combinations of ethylene and propylene glycols (approximately 50 mole percent or less of ethylene glycol) and maleic and/or fumaric acid; (4) propylene glycol, maleic and/or fumaric acids and dicyclopentadiene reacted with water. In addition to the above described polyesters one may also use dicyclopentadiene modified unsaturated polyester resins as described in the Pratt et al. U.S. Pat. No. 3,883,612. These examples are intended to be illustrative of suitable polyesters and are not intended to be all-inclusive. The acid number to which the polymerizable unsaturated polyesters are condensed is not particularly critical with respect to the ability of the low-profile resin to be cured to the desired product. Polyesters having been condensed to acid numbers of less than 100 are generally useful, but acid numbers less than 70 are preferred. The molecular weight of the polymerizable unsaturated polyester may vary over a considerable range, but ordinarily those polyesters useful in the practice of the present invention have a molecular weight ranging from 300 to 5000, and more preferably, from about 500 to 5000.

In preferred embodiments, the unsaturated polyester is present in amounts ranging from about 20 to 45 percent, by weight, based on the total four component resinous system comprising the unsaturated polyester, the low-profile additive, monomer and compatible component containing one or more polyoxyethane substituents. Especially preferred concentrations of the unsaturated polyester are in the 28 to 35 percent, by weight, range.

Low-profile additives are materials that when mixed in an unsaturated polyester and cured, result in a multi-phase system. If the low-profile additive and the unsaturated polyester are compatible (from the standpoint that a gross phase separation does not take place) before cure, the system is known as a one-pack. Those mixtures which tend to separate into two or more layers on standing are known as a two-pack resins systems. This does, however, necessitate mixing immediately before use. Some polymers that are useful as low-profile additives include homopolymers and copolymers of acrylic and methacrylic acid esters, cellulose acetate butyrate, vinyl acetate homopolymers and copolymers, polyurethanes prepared from polyisocyanates, preferably diisocyanates, and polyether polyols, numerous saturated polyesters, polycaprolactone, styrene-butadiene copolymers, some modified celluloses, and certain alkyl oxide polymers. The above list of low-profile additives is not intended to list all low-profile additives but rather to show examples of materials which have been used to cause the multiphase morphology present in low profile resins. In preferred embodiments the thermoplastic additive is present in amounts ranging from 5 to 30 percent, by weight, based on the total four component resinous system. Especially preferred concentrations of thermoplastic additive are in the 7 to 20 percent, by weight range.

The monomer component comprises materials that copolymerize with the unsaturated polyester. The olefinically unsaturated monomer that is copolymerizible with the unsaturated polyester is most generally styrene, however, methyl-styrene is also useful. In preferred embodiments the monomer is present in amounts ranging from 25 to 65 percent, by weight, based on the total four component resinous system. Especially preferred concentrations of monomer are in the 35 to 50 percent, by weight range.

In the present invention one or more components are added which are compatible with the unsaturated polyester and monomer during cure. According to the present invention, these compatible components give the added benefits of surface smoothness and better flowability, when compared with low-profile resin compositions without the compatible components. In the preferred embodiments the compatible component is present in amounts ranging from 0.5 to 15 percent, by weight, based on the total four component resinous system. Especially preferred concentrations of the compatible components are in the 1 to 8 percent, by weight range.

The compatible components of the present invention contains one or more polyoxyethane substituents having a general structure:

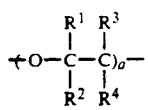

wherein $R^1$, $R^2$, $R^3$ and $R^4$ are selected from the group consisting of hydrogen, cycloalkyl, lower alkyl, phenyl, phenyl substituted by halogen, lower alkyl, acyl or lower alkoxy and phenyl lower alkyl wherein phenyl may be substituted by halogen, lower alkyl or lower alkoxy; $R^1$, $R^2$, $R^3$ and $R^4$ may be the same or different; and, a is an integer between about 1 and 200, and in some embodiments, a is less than 100 and in certain embodiments a is between 3 and 70.

The following terms used herein: "lower alkyl", "lower alkoxy", "lower phenyl", "cycloalkyl" and "acyl" generally contain from 1 to 50 carbons, as is well understood by those skilled in the art.

One example of compatible components that contain polyoxyethane substituents are polymers such as a polyalkylene oxide which has a molecular weight of between about 200–5000. The molecular weight of the polyalkylene oxide polymer is such that the compatible component remains compatible with the curing unsaturated polyester and monomer. When the molecular weight of the polymer is too high, the polyalkylene oxide polymer is incompatible with the curing unsaturated polyester and monomer. At that point the polyalkylene oxide polymer acts like a low-profile additive component, which, by definition, is incompatible with the curing unsaturated polyester and monomer. Specific examples of polyalkylene oxide polymers useful as compatible components include polypropylene oxide having a molecular weight between about 200–1000 and polyethylene oxide having a molecular weight between about 200–5000.

Other examples of compatible components containing one or more polyoxyethane substituents are polyalkoxylated alkyl phenols such as polypropoxylated nonyl phenols, polyethoxylated nonyl phenols, polypropoxylated octyl phenols, polyethoxyated octyl phenols, and the like. Structure II below is an example of a polyalkoxylated alkyl phenol:

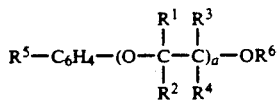

wherein $R^1$, $R^2$, $R^3$, $R^4$, $R^5$ and $R^6$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy; $R^1$, $R^2$, $R^3$, $R^4$, $R^5$ and $R^6$ may be the same or different; and a is an integer between 1 and about 200.

Specific examples of alkoxylated alkyl phenols include wherein a=8–10, $R^1$=$R^2$=$R^3$=$R^4$=H, $R^5$=$C_8H_{17}$ and $R^6$=H; and wherein a=8–10, and $R^1$ or $R^2$ or $R^3$ or $R^4$=$CH_3$ and the others =H, $R^5$=$C_8H_{17}$ and $R^6$=H.

Still other examples of compatible components containing one or more polyoxyethane substituents are esters of polyfunctional acids where the alcohols are polyalkylene oxide monoalkyl ethers. The structures below are illustrative:

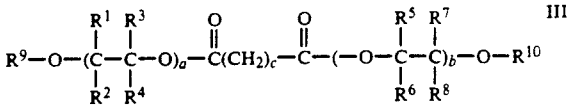

wherein $R^1$, $R^2$, $R^3$, $R^4$, $R^5$, $R^6$, $R^7$, $R^8$, $R^9$ and $R^{10}$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, and $R^1$, $R^2$, $R^3$, $R^4$, $R^5$, $R^6$, $R^7$, $R^8$, $R^9$ and $R^{10}$ may be the same or different; a and b are integers between 1 and about 200 and a and b may be the same or different, and c is an integer between 1 and about 30 and may be the same or different than a or b.

Specific examples of these compatible components include, for example, esters of citric acid, adipic acid and/or sebacic acid with tripropylene glycol monomethyl ether, dipropylene glycol monomethylether, diethylene glycol monomethyl ether, diethylene glycol monoethyl ether and the like.

Specific examples of esters of polyfunctional acids include wherein a=3, $R^1$=$R^2$=$R^3$=$R^4$=H, b=3, $R^5$=$R^6$=$R^7$=$R^8$=H, c=4, $R^9$=$R^{10}$=$CH_3$; and wherein a=3, $R^1$ or $R^2$ or $R^3$ or $R^4$=$CH_3$ and the others =H, b=3, $R^5$ or $R^6$ or $R^7$ or $R^8$=$CH_3$ and the others =H, c=4, $R^9$=$R^{10}$=$CH_3$.

Still more specific examples of esters include triesters of a general structure:

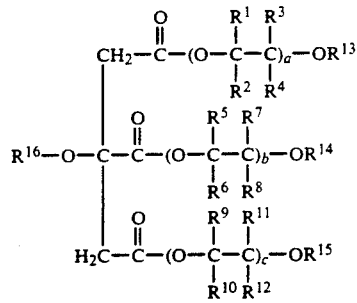

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and $R^{16}$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, and $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and $R^{16}$ may be the same or different, a, b, and c are integers between 1 and about 200, and a, b and c may be the same or different.

Specific examples of such triesters include wherein a=b=c=3, $R^1$=$R^2$=$R^3$=$R^4$=$R^5$=$R^6$=$R^7$=$R^8$=$R^9$=$R^{10}$=$R^{11}$=$R^{12}$=H, $R^{13}$=$R^{14}$=$R^{15}$=$CH_3$, and $R^{16}$=H; and wherein a=b=c=3, $R^1$ or $R^2$ or $R^3$ or $R^4$=$CH_3$ and the others=H, $R^5$ or $R^6$ or $R^7$ or $R^8$=CH$_3$ and the others =H, $R^9$ or $R^{10}$ or $R^{11}$ or $R^{12}$=CH$_3$ and the others =H, $R^{13}$=$R^{14}$=$R^{15}$=CH$_3$ and $R^{16}$=H.

Still more specific examples of esters include triesters of a general structure:

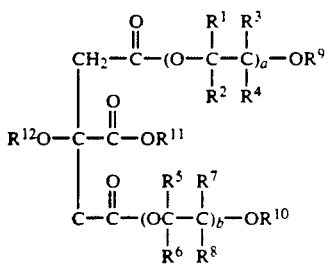

V wherein $R^1$, $R^2$, $R^3$, $R^4$, $R^5$, $R^6$, $R^7$, $R^8$, $R^9$, $R^{10}$, $R^{11}$ and $R^{12}$ are selected from the group consisting of hydrogen, cycloakyl, lower alkyl, phenyl, phenyl substituted by halogen, lower alkyl, acyl, or lower alkoxy and phenyl lower alkyl wherein phenyl may be substituted by halogen, lower alkyl or lower alkoxy, and $R^1$, $R^2$, $R^3$, $R^4$, $R^5$, $R^6$, $R^7$, $R^8$, $R^9$, $R^{10}$, $R^{11}$ and $R^{12}$ may be the same or different, a and b are integers between 1 and about 200 and b may be the same or different.

Specific examples of such diesters include wherein a=b=3, $R^1$=$R^2$=$R^3$=$R^4$=$R^5$=$R^6$=$R^7$=$R^8$=H, $R^9$=$R^{10}$=CH$_3$ and $R^{11}$=$R^{12}$=H; and wherein a=b=3, $R^1$ or $R^2$ or $R^3$ or $R^4$=CH$_3$ and others =H, $R^5$ or $R^6$ or $R^7$ or $R^8$=CH$_3$ and the others =H, $R^9$=$R^{10}$=CH$_3$ and $R^4$=$R^{12}$=H.

Still more specific examples of esters include triesters of a general structure:

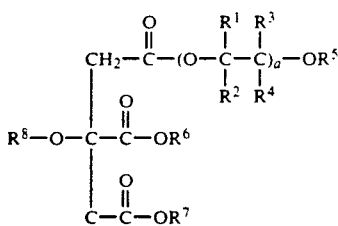

VI $R^1$, $R^2$, $R^3$, $R^4$, $R^5$, $R^6$, $R^7$ and $R^8$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, and $R^1$, $R^2$, $R^3$, $R^4$, $R^5$, $R^6$, $R^7$ and $R^8$ may be the same or different, and a is an integer between 1 and about 200.

Specific examples of such monoesters include wherein a=3, $R^1$=$R^2$=$R^3$=$R^4$=H, $R^5$=CH$_3$ and $R^6$=$R^7$=$R^8$=H; and wherein a=3, $R^1$ or $R^2$ or $R^3$ or $R^4$=CH$_3$ and the others =H, $R^5$=CH$_3$ and $R^6$=$R^7$=$R^8$=H.

The four component resinous system of this invention is suitable for mixing with other ingredients in order to form a sheet molding composition. For example, the four component resinous system is suitable for mixing with chemical thickeners which are physically mixed into the resin emulsion. The chemical thickeners generally include metal oxides, hydroxides and alkoxides of Group II, III or IV from the Periodic Table. Calcium oxide and magnesium oxide or the respective hydroxides are most often employed with four component resin compositions of the present invention. In preferred embodiments, the thickener is present in amounts ranging from about 0.5 to 6 parts, by weight, based on the four component resinous system. The thickener is generally suspended in a carrier resin, as is known in the art. In preferred embodiments the carrier material comprises a composition which does not react with the thickener such as, for example, polymethylmethacrylate, polyvinylacetate, saturated or unsaturated polyesters, and similar materials well-known in the art. In preferred embodiments the carrier resin is present in amounts ranging from about 0.5 to 8 parts, by weight, based on one hundred parts of the four component resinous system.

Catalysts are incorporated in small amounts into thermosetting polyester resins containing ethylenically unsaturated monomer for curing or cross-linking the unsaturated polyester with the monomer. Such catalysts are well known and may be similarly utilized in this invention curing the unsaturated polyester and monomer mixed with the low-profile thermoplastic polymer. Typical catalysts, for example, include organic peroxides and peracids such as tertiary butyl perbenzoate, tertiary butyl peroctoate, benzoyl peroxide and the like. The amounts of catalysts may be varied with the molding process and similarly varied with the level and types of inhibitors utilized, in a manner well known in the art. In preferred embodiments the catalyst is present in amounts ranging from about 0.5 to 2.5 parts, by weight, based on one hundred parts of the four component resinous system.

Curing of the composition is carried out under heat and pressure typically, in closed, preferably positive pressure type molds. Mold release agents may be added to the compositions to perform their normal function, as is well understood in the art.

Fibers, fillers and pigments normally added to resin compositions can be likewise used in formulating the sheet molding composition of this invention. Reinforcing fibers or fibrous reinforcement is taken to mean glass fibers in one form or another, such as glass fabrics, chopped glass strands, chopped or continuous strand glass fiber mat; however, the terms also include reinforcing agents which may also be used if desired, for example, asbestos, cotton, synthetic organic fibers and metals. Fillers, usually inert, and inorganic material useful with the compositions of the present invention include, for example, clay, talc, calcium carbonate, silica, calcium silicate, and the like. In preferred embodiments the fillers are present in amounts ranging from about 165-250 parts, by weight, based on one hundred parts of the four component resinous system.

Examples of pigments include carbon black, iron oxide, titanium dioxide, and the like, as well as organic pigments. In preferred embodiments the pigments are present in amounts ranging from about 0 to 4 parts, by weight, based on one hundred parts of the four component resinous system.

In one aspect of the present invention the preparation of the sheet molding composition is generally carried out by blending together a first portion comprising the unsaturated polyester, the low-profile additive, the monomer, the compatible component, and such additives as a catalyst, mold release agent and fillers. This is generally known in the industry as the A-side formulation. The second portion (generally known as the B-side formulation) comprises the thickening agent and a carrier therefor, and such additives as pigments and mold release agents. In another aspect of the invention an additional monomer is added to the B-side formulation in which the thickener is suspended. In preferred embodiments the additional monomer comprises vinyl toluene or styrene. In preferred embodiments, the additional monomer is present in amounts ranging from about 1 to 8 parts, by weight, based on one hundred parts of the four component resinous system.

The sheet molding composition of the present invention can be prepared by mixing the components in a suitable apparatus at temperatures which are conventional and known to those skilled in the art. Once the sheet molding composition is formulated, the composition can be molded into thermoset articles having a desired shape. The actual molding cycle will, of course, depend upon the exact composition being molded. In preferred embodiments suitable molding cycles are conducted at temperatures ranging from about 250°–350° F. for periods of time ranging from about ½ to about 5 minutes.

The following formulations are provided to illustrate examples of the compositions of the present invention and are not intended to restrict the scope thereof. All parts are parts by weight, unless otherwise expressly specified.

TABLE I

Resin Compositions

| Ingredients | Range (wt. %) | Preferred Range (wt. %) |
|---|---|---|
| Unsaturated polyester | 20–45 | 28–35 |
| Thermoplastic additive (low-profile) | 5–30 | 7–20 |
| Monomer | 25–65 | 35–50 |
| Compatible component | 0.5–15 | 1–8 |
| | 100 | 100 |

TABLE II

Sheet Molding Composition Formulations

| | Formulations | | | | |
|---|---|---|---|---|---|
| Ingredients | A | B | C | D | E |
| Resin | 100 | 100 | 100 | 100 | 100 |
| Catalyst | 1.5 | 1.5 | 1.5 | 1.5 | 1.5 |
| Release agent | 5.0 | 4.5 | 4.5 | 4.5 | 3.5 |
| Filler | 230 | 220 | 230 | 180 | 200 |
| Thickener | 4.0 | 5.0 | 4.0 | 4.0 | 4.0 |
| Pigment | 0.1 | 0.2 | 0.1 | 0.1 | 0.1 |
| Carrier | 1.55 | — | 1.55 | 1.55 | 1.55 |
| Secondary monomer | 5.6 | — | 5.6 | 5.6 | 5.6 |

The sheet molding compositions of the above formulations have shown unexpected improvements in surface aesthetics and mold fillout. These improvements are especially significant for use in sheet molding compound (SMC). Moreover, increasingly thinner automobile parts are able to be molded with smoother surfaces than by any known systems.

For formulation A the unsaturated polyester comprises maleic anhydride and propylene glycol; the low-profile additive comprises a saturated polyester made from ethylene glycol and propylene glycol and adipic acid; the monomer comprises styrene; the compatible component comprises a polypropylene oxide having a molecule weight between about 200 and 2000; the catalyst comprises tertiary butyl perbenzoate; added to the A-side, the release agent comprises calcium stearate and zinc stearate; the filler comprises calcium carbonate; the thickener comprises magnesium hydroxide; the carrier comprising polymethylmethacrylate; the pigment comprises a carbon black pigment suspension; and the secondary monomer comprises vinyl toluene.

Compression molded panels made with Formulation A with 27 percent, by weight, of 1" chopped glass fibers. When measured on a surface smoothness index instrument (LORIA ® registered trademark of the Ashland Chemical Co.) the panels gave a number of 60–70 as compared to the same formulation but without the compatible component which gave a number of 80–90. On the LORIA ® instrument, the lower the number, the smoother the surface.

For formulation B the unsaturated polyester comprises maleic anhydride and propylene glycol; the low-profile additive comprises a saturated polyester made from ethylene glycol and propylene glycol and adipic acid; the monomer comprises styrene; the compatible component comprises a triester of citric acid with tripropylene glycol monomethyl ether; the catalyst comprises tertiary butyl perbenzoate; the release agent comprises calcium stearate; the filler comprises calcium carbonate; the thickener comprises magnesium hydroxide; and, the pigment comprises a carbon black pigment suspension.

Compression molded panels made with Formulation B with 27 percent, by weight, of 1" chopped glass fibers. When measured on a surface smoothness index instrument (LORIA ®) the panels gave a number of 55–60 as compared to the same formulation but without the compatible component which gave a number of 80–90.

For formulation C the unsaturated polyester comprises maleic anhydride and propylene glycol; the low-profile additive comprises a saturated polyester made from ethylene glycol and propylene glycol and adipic acid; the monomer comprises styrene; the compatible component comprises octyl phenol reacted with ethylene oxide where the repeating ethylene oxide units are 9–12; the catalyst comprises tertiary butyl perbenzoate; the release agent comprises calcium stearate and zinc stearate; the filler comprises calcium carbonate; the thickener comprises magnesium hydroxide suspended in a carrier comprising polymethylmethacrylate; the pigment comprises a carbon black pigment suspension; and the secondary monomer comprises vinyl toluene.

Compression molded panels made with Formulation C with 27 percent, by weight, of 1" chopped glass fibers. When measured on a surface smoothness index instrument (LORIA ®) the panels gave a number of 50–60 as compared to the same formulation but without the compatible component which gave a number of 80–90.

For formulation D the unsaturated polyester comprises maleic anhydride, propylene glycol, and dicyclopentadiene; the low-profile additive comprises an acid functional copolymer of vinyl acetate and methyl methylacrylate; the monomer comprises styrene; the compatible component comprises polypropylene oxide having a molecular weight between about 200 and 2000; the catalyst comprises tertiary butyl perbenzoate; the release agent comprises zinc stearate; the filler comprises calcium carbonate; the thickener comprises magnesium hydroxide; the carrier comprises polymethylmethacrylate; the pigment comprises a carbon black pigment suspension; and the secondary monomer comprises vinyl toluene.

Compression molded panels were made with formulation D with 27 percent, by weight, of 1 inch chopped glass fibers. When measured on a surface smoothness index instrument, LORIA ®, the panels gave a number of 152 as compared to the same formulation without the compatible component which gave a number of 175.

For formulation E the unsaturated polyester comprises maleic anhydride and propylene glycol; the low-profile additive comprises polyvinylacetate; the monomer comprises styrene; the compatible component comprises polypropylene oxide having a molecular weight between about 200 and 2000; the catalyst comprises tertiary butyl perbenzoate; the release agent comprises zinc stearate; the filler comprises calcium carbonate; the thickener comprises magnesium hydroxide; the carrier comprises polymethylmethacrylate; the pigment comprises a carbon black pigment suspension; and the secondary monomer comprises vinyl toluene.

Compression molded panels were made with formulation E with 27 percent, by weight, of 1 inch chopped glass fiber. When measured on a surface smoothness index instrument, LORIA ®, the panels gave a number of 60 as compared to the same formulation without the compatible component which gave a number of 66.

Although the invention has been described in its preferred form with a certain degree of particularly, it is understood that the present disclosure has been made only by way of example, and that numerous changes can be made without departing from the spirit of the scope of the invention.

We claim:

1. A four component resinous system for a sheet molding composition comprising:
   (a) an unsaturated polyester comprising a polycondensation product of one or more dihydric alcohols and one or more ethylenically unsaturated polycarboxylic acids;
   (b) one or more low-profile thermoplastic polymers which cause phase separation and porosity during a curing reaction;
   (c) one or more olefinically unsaturated monomers which copolymerizes with the unsaturated polyester, and,
   (d) one or more compatible components containing one or more polyoxyethane substituents having a general structure;

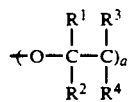

wherein $R^1$, $R^2$, $R^3$ and $R^4$ are selected from the group consisting of hydrogen, cycloalkyl, lower alkyl, phenyl, phenyl substituted by halogen, lower alkyl, acyl or lower alkoxy and phenyl lower alkyl wherein phenyl may be substituted by halogen, lower alkyl or lower alkoxy; $R^1$, $R^2$, $R^3$ and $R^4$ may be the same or different; a is an integer between 1 and about 200; and wherein the compatible component remains compatible with the unsaturated polyester and monomer.

2. The compositions of claim 1, wherein the compatible component comprises one or more polyalkylene oxides having molecular weights of between about 200–5000.

3. The compositions of claim 2, wherein the compatible component comprises one or more polypropylene oxides having molecular weights between about 200–2000.

4. The compositions of claim 2, wherein the compatible component comprises one or more polyethylene oxides having molecular weight between about 200–5000.

5. A four component resinous system for a sheet molding composition comprising:
   (a) an unsaturated polyester comprising a polycondensation product of one or more dihydric alcohols and one or more ethylenically unsaturated polycarboxylic acids;
   (b) one or more low-profile thermoplastic polymers which cause phase separation and porosity during a curing reaction;
   (c) one or more olefinically unsaturated monomers which copolymerizes with the unsaturated polyester, and,
   (d) one or more compatible components comprising one or more polyalkoxylated alkyl phenols.

6. The compositions of claim 5, wherein the polyalkoxylated alkyl phenol has a general structure:

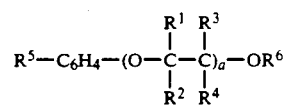

wherein $R^1$, $R^2$, $R^3$, $R^4$, $R^5$ and $R^6$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, $R^1$, $R^2$, $R^3$, $R^4$, $R^5$ and $R^6$ may be the same or different, and a is an integer between 1 and about 200.

7. A four component resinous system for a sheet molding composition comprising:
   (a) an unsaturated polyester comprising a polycondensation product of one or more dihydric alcohols and one or more ethylenically unsaturated polycarboxylic acids;
   (b) one or more low-profile thermoplastic polymers which cause phase separation and porosity during a curing reaction;
   (c) one or more olefinically unsaturated monomers which copolymerizes with the unsaturated polyester, and,
   (d) one or more compatible components comprising one or more esters of polyfunctional acids.

8. The compositions of claim 7, wherein the esters of polyfunctional acids have a general structure:

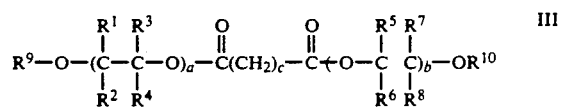

wherein $R^1$, $R^2$, $R^3$, $R^4$, $R^5$, $R^6$, $R^7$, $R^8$, $R^9$ and $R^{10}$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, $R^1$, $R^2$, $R^3$, $R^4$, $R^5$, $R^6$, $R^7$, $R^8$, $R^9$ and $R^{10}$ may be the same or different, a and b are integers between 1 and about 200, a and b may be the same or different, and c is an integer between 1 and about 30 and may be the same or different than a or b.

9. The composition of claim 7, wherein the esters are triesters having a general structure:

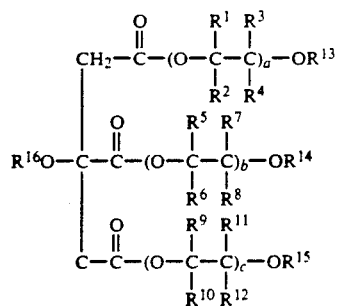

wherein $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and $R^{16}$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, and $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$ and $R^{16}$ may be the same or different, a, b, and c are integers between 1 and about 200, and a, b and c may be the same or different.

10. The compositions of claim 7, wherein the esters are diesters having a general structure:

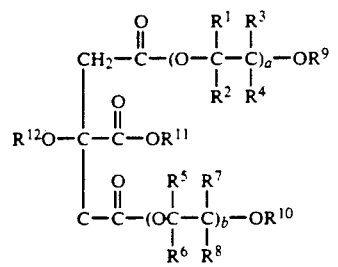

wherein $R^1$, $R^2$, $R^3$, $R^4$, $R^5$, $R^6$, $R^7$, $R^8$, $R^9$, $R^{10}$, $R^{11}$ and $R^{12}$ are selected from the group consisting of hydrogen, cycloalkyl, lower alkyl, phenyl, phenyl substituted by halogen, lower alkyl, acyl, or lower alkloxy and phenyl lower alkyl wherein phenyl may be substituted by halogen, lower alkyl or lower alkoxy, and $R^1$, $R^2$, $R^3$, $R^4$, $R^5$, $R^6$, $R^7$, $R^8$, $R^9$, $R^{10}$, $R^{11}$ and $R^{12}$ may be the same or different, a and b are integers between 1 and about 200 and a, b and c may be the same or different.

11. The compositions of claim 7, wherein the esters are triesters having a general structure:

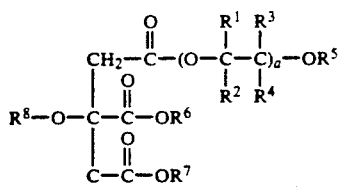

wherein $R^1$, $R^2$, $R^3$, $R^4$, $R^5$, $R^6$, $R^7$ and $R^8$ are selected from the group consisting of hydrogen, cycloalkyl, lower alkyl, phenyl, phenyl substituted by halogen, lower alkyl, acyl, or lower alkoxy and phenyl lower alkyl wherein phenyl may be substituted by halogen, lower alkyl or lower alkoxy, and $R^1$, $R^2$, $R^3$, $R^4$, $R^5$, $R^6$, $R^7$ and $R^8$ may be the same or different, and a is an integer between 1 and about 200.

12. The compositions of claim 5, wherein the unsaturated polyester comprises the polycondensation product of dihydric alcohols and an ethylenically unsaturated polycarboxylic acid.

13. The compositions of claim 12 wherein the unsaturated polyester comprises the polycondensation product of maleic and/or fumaric acids and propylene glycol.

14. The compositions of claim 12, wherein the unsaturated polyester comprises the polycondensation product of 1,3-butanediol and maleic and/or fumaric acids.

15. The compositions of claim 12, wherein the unsaturated polyester comprises the polycondensation product of ethylene and propylene glycols comprising approximately 50 mole percent or less of ethylene glycol, and maleic and/or fumaric acids.

16. The compositions of claim 12, wherein the unsaturated polyester comprises the polycondensation product of propylene glycol, maleic and/or fumaric acids and dicyclopentadiene reacted with water.

17. The compositions of claim 12, comprising the polycondensation product of propylene glycol, maleic and/or fumaric acids and isophthalic acid.

18. The compositions of claim 5, wherein the low-profile thermoplastic polymer comprises a reaction product of ethylene glycol and propylene glycol and adipic acid.

19. The compositions of claim 5, wherein the low-profile thermoplastic polymer comprises a polyvinyl acetate homopolymer or copolymer.

20. The compositions of claim 5, wherein the low-profile thermoplastic polymer comprises a polymethylmethacrylate.

21. The compositions of claim 5, wherein the monomer comprises styrene.

22. The compositions of claim 5, wherein the monomer comprises methyl-styrene.

23. The compositions of claim 5, wherein the monomer comprises vinyl toluene.

24. The compositions of claim 5, wherein the unsaturated polyester is present in an amount of approximately 25-45 percent, by weight, of the four component resin.

25. The compositions of claim 23, wherein the unsaturated polyester is present in an amount of approximately 28-35 percent, by weight, of the four component resin.

26. The compositions of claim 5, wherein the low-profile thermoplastic polymer is present in an amount of approximately 5-30 percent, by weight, of the four component resin.

27. The compositions of claim 26, wherein the low-profile thermoplastic polymer is present in an amount of approximately 7-15 percent, by weight, of the four component resin.

28. The compositions of claim 5, wherein the monomer is present in an amount of approximately 25-65 percent, by weight, of the four component resin.

29. The compositions of claim 28, wherein the monomer is present in an amount of approximately 35-50 percent, by weight, of the four component resin.

30. The composition of claim 5, wherein the compatible component is present in an amount of approximately 0.5-15 percent, by weight, of the four component resin.

31. The compositions of claim 30, wherein the compatible component is present in an amount of approximately 1-8 percent, by weight, of the four component resin.

32. The compositions of claim 7, wherein the unsaturated polyester comprises the polycondensation product of dihydric alcohols and an ethylenically unsaturated polycarboxylic acid.

33. The compositions of claim 32, wherein the unsaturated polyester comprises the polycondensation product of maleic and/or fumaric acids and propylene glycol; the polycondensation product of 1,3-butanediol and maleic and/or fumaric acids; the polycondensation product of ethylene and propylene glycols comprising approximately 50 mole percent or less of ethylene glycol, and maleic and/or fumaric acids; the polycondensation product of propylene glycol, maleic and/or fumaric acids and dicyclopentadiene reacted with water; or, the polycondensation product of propylene glycol, maleic and/or fumaric acids and isophthalic acid.

34. The compositions of claim 7, wherein the low-profile thermoplastic polymer comprises a reaction product of ethylene glycol and propylene glycol and adipic acid; a polyvinyl acetate homopolymer or copolymer; or, a polymethylmethacrylate.

35. The compositions of claim 7, wherein the monomer comprises styrene; methyl-styrene; or, vinyl toluene.

36. The compositions of claim 7, wherein the unsaturated polyester is present in an amount of approximately 25-45 percent, by weight; the low-profile thermoplastic polymer is present in an amount of approximately 5-30 percent, by weight; the monomer is present in an amount of approximately 25-65 percent, by weight; and the compatible component is present in an amount of approximately 0.5-15 percent, by weight, of the four component resin.

37. The compositions of claim 36, wherein the unsaturated polyester is present in an amount of approximately 28-35 percent, by weight; the low-profile thermoplastic polymer is present in an amount of approximately 7-15 percent, by weight; the monomer is present in an amount of approximately 35-50 percent, by weight; and the compatible component is present in an amount of approximately 1-8 percent, by weight, of the four component resin.

* * * * *